United States Patent
Kim et al.

(10) Patent No.: US 9,316,530 B2
(45) Date of Patent: Apr. 19, 2016

(54) METHOD AND APPARATUS FOR CONTROLLING AMOUNT OF LIGHT IN VISIBLE LIGHT COMMUNICATION SYSTEM

(71) Applicant: Samsung Electronics Co., Ltd., Suwon-si, Gyeonggi-do (KR)

(72) Inventors: Do-Young Kim, Hwaseong-si (KR); Dong-Keon Kong, Suwon-si (KR); Dong-Woo Kim, Yongin-si (KR); Jeong-Je Park, Hwaseong-si (KR); Kwang-Hyeon Lee, Seoul (KR); Nae-Hyun Lim, Seoul (KR); Hyoung-Kyu Lim, Seoul (KR); Yong Chang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 14/061,248

(22) Filed: Oct. 23, 2013

(65) Prior Publication Data

US 2014/0110561 A1    Apr. 24, 2014

(30) Foreign Application Priority Data

Oct. 24, 2012    (KR) .................. 10-2012-0118459

(51) Int. Cl.
*G01J 1/18* (2006.01)
*H04B 10/116* (2013.01)

(52) U.S. Cl.
CPC ............. *G01J 1/18* (2013.01); *H04B 10/116* (2013.01)

(58) Field of Classification Search
CPC ................... G01J 1/18; H04B 10/116
USPC ......................................................... 250/205
See application file for complete search history.

(56) References Cited

U.S. PATENT DOCUMENTS

| | | |
|---|---|---|
| 6,212,416 B1 | 4/2001 | Ward et al. |
| 6,366,494 B2 | 4/2002 | Weber et al. |
| 6,497,729 B1 | 12/2002 | Moussy et al. |
| 2003/0099682 A1 | 5/2003 | Moussy et al. |
| 2008/0154101 A1 | 6/2008 | Jain et al. |
| 2009/0101498 A1 | 4/2009 | Papadimitrakopoulos et al. |
| 2010/0116691 A1 | 5/2010 | Papadimitrakopoulos et al. |
| 2012/0075634 A1 | 3/2012 | Sieben-Xu et al. |

OTHER PUBLICATIONS

Qiang et al., Edge-plane Microwire Electrodes for Highly Sensitive H2O2 and Glucose Detection, Biosensors and Bioelectronics 26 (2011) 3755-3760, 2011, Elsevier B.V., Storrs, CT.
Jain et al., Emerging Synergy Between Nanotechnology and Implantable Biosensors: A Review, Biosensors and Bioelectronics 25 (2010) 1553-1565, 2009, Elsevier B.V., Storrs, CT.

(Continued)

*Primary Examiner* — Renee D Chavez
(74) *Attorney, Agent, or Firm* — Jefferson IP Law, LLP

(57) ABSTRACT

A method and an apparatus for controlling an amount of light in a visible light communication system are provided. In the visible light communication system, a terminal measures an amount of light for a light signal received from a sensor, determines whether the measured amount of light is less than a threshold value, increases an amount of light for a light source signal to transmit to the sensor when the measured amount of light is less than the threshold value, and transmits, to the sensor, a light source signal according to the increased amount of light.

18 Claims, 14 Drawing Sheets

(56) References Cited

OTHER PUBLICATIONS

Bhardwaj et al., PLGA/PVA Hydrogel Composites for Long-term Inflammation Control Following S.C. Implantation, International Journal of Pharmaceutics 384 (2010) 78-86, 2009, Elsevier B.V., Storrs, CT.

Vaddiraju et al., Enhanced Glucose Sensor Linearity Using Poly(Vinyl Alcohol) Hydrogels, Journal of Diabetes Science and Technology, Jul. 4, 2009, vol. 3, Issue 4, Diabetes Technology Society.

Vaddiraju et al., The Role of H2O2 Outer Diffusion on the Performance of Implantable Glucose Sensors, Biosensors and Bioelectronics 24 (2009) 1557-1562, 2008, Elsevier B.V., Storrs, CT.

IMPOSSIBLE TO TRANSMIT
SIGNAL DUE TO DEFICIENCY
IN ELECTRICAL POWER

PROBLEMS OCCUR DUE TO
DECREASE IN AMOUNT OF LIGHT

R : RECEIVER
E : PHOTOVOLTAIC POWER SOURCE
T : TRANSMITTER
L : POWER SOURCE (LED)

T : TRANSMITTER
L : POWER SOURCE (LED)
R : RECEIVER
E : PHOTOVOLTAIC POWER SOURCE

METHOD AND APPARATUS FOR CONTROLLING AMOUNT OF LIGHT IN VISIBLE LIGHT COMMUNICATION SYSTEM

CROSS-REFERENCE TO RELATED APPLICATION(S)

This application claims the benefit under 35 U.S.C. §119(a) of a Korean patent application field on Oct. 24, 2012 in the Korean Intellectual Property Office and assigned Serial No. 10-2012-0118459, the entire disclosure of which is hereby incorporated by reference.

TECHNICAL FIELD

The present disclosure relates to a method and an apparatus for controlling a communication system. More specifically, the present disclosure relates to a method and an apparatus for controlling an amount of light in a visible light communication system.

BACKGROUND

In recent years, communication techniques using visible light have been used in a variety of fields due to the development of wireless communication systems. For example, in the field of medicine, a bio-sensor has been used to analyze biological materials including blood. The bio-sensor may be inserted into a human body, and may perform communication with an external terminal such as a watch, a patch, a band, etc. using visible light. The bio-sensor may receive a light source signal from the external terminal, and may generate electrical power based on the acquired amount of light to transmit a signal, when the acquired amount of light is more than or equal to a threshold value.

A transmission performance of the bio-sensor may be determined according to the depth by which the bio-sensor is inserted into the human body. This is because an amount of light used for signal transmission in the bio-sensor is influenced by the depth to which the bio-sensor is inserted into the human body.

More specifically, in a case where the depth to which the bio-sensor is inserted into the human body is larger than or equal to a threshold value, the bio-sensor can perform communication with the external terminal only if an amount of light capable of passing through skin is used to correspond to the depth. If the amount of light capable of passing through the skin is not used in the bio-sensor, the external terminal cannot decode the signal received from the bio-sensor.

Visible light transmitted from the bio-sensor may be scattered or dispersed by moisture such as sweat. Further, when locations of the bio-sensor and the external terminal for signal transmission/reception do not accurately match each other, communication between the bio-sensor and the external terminal cannot be performed. Thus, in view of these and other problems, it is necessary that the amount of light of the bio-sensor is used through an adaptive adjustment. However, the amount of light of the bio-sensor is fixedly used according to the related art, so an improved apparatus and method for addressing the above-described problems are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide the advantages described below. Accordingly, an aspect of the present disclosure is to provide a method and an apparatus for controlling an amount of light in a visible light communication system.

Another aspect of the present disclosure is to provide a method and an apparatus, in which signal transmission/reception can be seamlessly performed between two devices performing communication though visible light.

Another aspect of the present disclosure is to provide a method and an apparatus, in which a terminal can decode a signal received from a sensor, irrespective of a depth to which the sensor is inserted into a human body.

In accordance with an aspect of the present disclosure, a method of controlling an amount of light of a terminal in a visible light communication system is provided. The method includes measuring an amount of light for a light signal received from a sensor, determining whether the measured amount of light is less than a threshold value, increasing an amount of light for a light source signal to transmit to the sensor when the measured amount of light is less than the threshold value, and transmitting, to the sensor, a light source signal according to the increased amount of light.

In accordance with an aspect of the present disclosure, a method of controlling an amount of light of a terminal in a visible light communication system is provided. The method includes determining whether a light signal received from a sensor is detected in a reception area smaller than a reference size, increasing an amount of light for a light source signal to transmit to the sensor, when the light signal received from the sensor is detected in the reception area smaller than the reference size, and transmitting, to the sensor, a light source signal according to the increased amount of light.

In accordance with an aspect of the present disclosure, a terminal in a visible light communication system is provided. The terminal includes a receiver configured to receive a light signal from a sensor, a controller configured to measure an amount of light for the light signal received from the sensor, to determine whether the measured amount of light is less than a threshold value, and to increase an amount of light for a light source signal to transmit to the sensor when the measured amount of light is less than the threshold value, and a power source configured to transmit, to the sensor, a light source signal according to the increased amount of light.

In accordance with another aspect of the present disclosure, a terminal in a visible light communication system is provided. The terminal includes a receiver configured to receive a light signal from a sensor, a controller configured to determine whether the light signal received from the sensor is detected in a reception area smaller than a reference size, and to increase an amount of light for a light source signal to transmit to the sensor when the light signal received from the sensor is detected in the reception area smaller than the reference size, and a power source configured to transmit, to the sensor, a light source signal according to the increased amount of light.

As described above, an aspect of the present disclosure is to provide a method and an apparatus for controlling an amount of light in a visible light communication system, in which signal transmission/reception can be seamlessly performed between two devices performing communication using visible light.

Further, according to embodiments of the present disclosure, a terminal can decode a signal received from a sensor, irrespective of a depth to which the sensor is inserted into a human body.

Furthermore, according to embodiments of the present disclosure, a terminal can effectively control an amount of light without changing operations of the existing sensor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
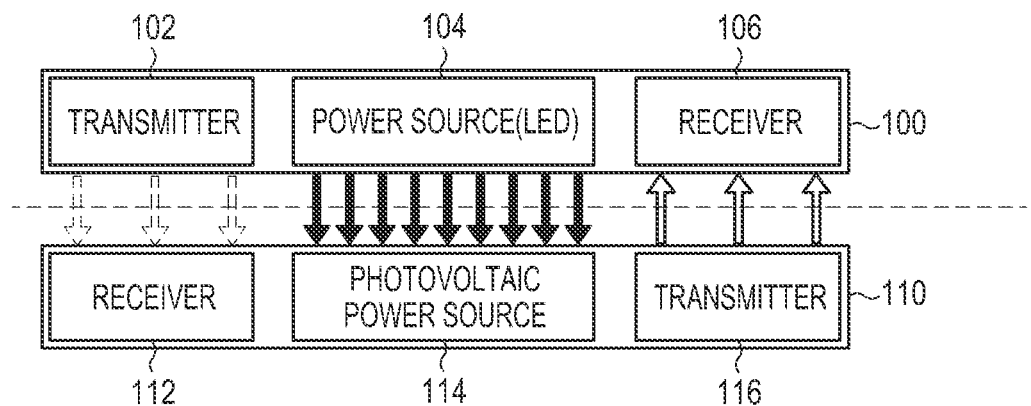
FIGS. 1A and 1B illustrate a process for transmitting/receiving signals between a bio-sensor and a terminal.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, various embodiments of the present disclosure will be described with reference to the accompanying drawings. Further, a detailed description of known functions and configurations incorporated herein will be omitted when it may make the subject matter of the present disclosure rather unclear.

Embodiments of the present disclosure propose a method and an apparatus for controlling an amount of light in a visible light communication system. Specifically, embodiments of the present disclosure propose a method and an apparatus for seamlessly performing signal transmission/reception between a sensor and a terminal, which perform communication using visible light. In embodiments of the present disclosure, the sensor may be a bio-sensor inserted into a living body or a sensor attached to a specific apparatus, and the terminal may be a cellular phone, a watch, a patch, or the like. In embodiments of the present disclosure that will be presented hereinafter, the bio-sensor that is to be inserted into a human body will be described as an example of the sensor in order to help comprehension of the present disclosure. However, it is to be understood that this is merely for sake of convenience and not by way of limitation.

Hereinafter, a signal transmission/reception operation between a bio-sensor and a terminal will be described with reference to FIGS. 1A and 1B.

Figure 1B:
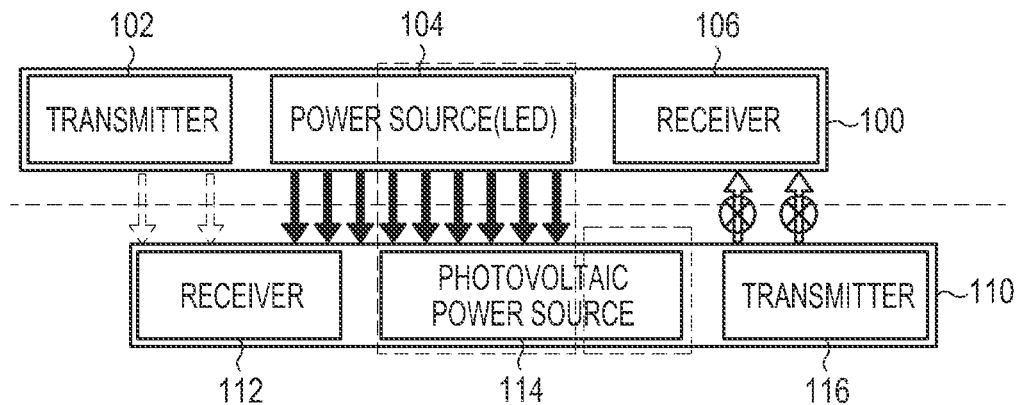

FIGS. 1A and 1B illustrate a process for transmitting/receiving signals between a bio-sensor and a terminal.

Referring to FIG. 1A, a terminal 100 is located outside a human body, and includes a transmitter 102, a power source 104, and a receiver 106.

The transmitter 102 transmits a signal. For example, the transmitter 102 may transmit, to a bio-sensor 110, a preparatory signal representing that the power source 104 is to transmit a light source signal. The light source signal may be used as a resource for signal transmission/reception in the bio-sensor 110, and the preparatory signal may be transmitted in the form of a light signal periodically or at a specific time point to the bio-sensor 110.

The power source 104 allots resources to the bio-sensor 110 using light, and transmits a light source signal to the bio-sensor 110. For example, the power source 104 may include a Light Emitting Diode (LED). The light source signal may be transmitted to the bio-sensor 110 periodically or at a specific time point. Meanwhile, the power source 104 may perform an operation of the transmitter 102 in accordance with embodiments of the present disclosure, in which case the transmitter 102 may not be included in the terminal 100.

The receiver 106 receives a signal from the bio-sensor 110. The signal transmission/reception through the transmitter 102 and the receiver 106 may be performed based on visible light communication, and the receiver 106 may include a photo detector which detects a light signal.

Meanwhile, although not illustrated in FIG. 1A, the terminal 100 may further include a controller, and the controller may control the transmitter 102, the power source 104, and the receiver 106 such that an operation of the terminal according to an embodiment of the present disclosure may be performed.

In implementation, the bio-sensor 110 may be inserted into a subcutaneous tissue inside a human body, and includes a receiver 112, a photovoltaic power source 114, and a transmitter 116.

The receiver 112 receives a signal from the transmitter 102 of the terminal 100. For example, the receiver 112 may receive the preparatory signal. The photovoltaic power source 114 receives the light source signal from the power source 104 of the terminal 100, and generates, based on light resources acquired through the received light source signal, electrical power for signal transmission/reception.

The transmitter 116 transmits a signal to the terminal 100 using the generated electrical power. For example, the transmitter 116 may transmit, to the terminal 100, a bio-signal including information of blood sugar, blood pressure, and the like.

Meanwhile, although not illustrated in FIG. 1A, the bio-sensor 110 may further include a controller, and the controller may control the receiver 112, the photovoltaic power source 114, and the transmitter 116 such that an operation of the bio-sensor according to an embodiment of the present disclosure may be performed.

The highest throughput for the signal transmission/reception between the terminal 100 and the bio-sensor 110 may be achieved when locations of the transmitter 102, the power source 104, and the receiver 106 of the terminal 100 correspond to locations of the receiver 112, the photovoltaic power source 114, and the transmitter 116 of the bio-sensor 110 in one-to-one manner. If the internal configurations of the terminal 100 and the bio-sensor 110 do not correspond to each other in the one-to-one manner, the throughput for the signal transmission/reception between the terminal 100 and the bio-sensor 110 is reduced. A description of such non-correspondence will be given with reference to FIG. 1B.

Referring to FIG. 1B, when the internal configurations of the terminal 100 and the bio-sensor 110 do not correspond to each other in the one-to-one manner, the bio-sensor 110 fails to acquire an amount of light corresponding to an amount of electrical power necessary for signal transmission, and thus cannot transmit the signal.

More specifically, when the location of the power source 104 of the terminal 100 does not correspond to the location of the photovoltaic power source 114 of the bio-sensor 110, even if the power source 104 of the terminal 100 transmits a light source signal corresponding to an amount of light required by the bio-sensor 110, the photovoltaic power source 114 fails to receive the entire transmitted light source signal. Thus, the bio-sensor 110 does not acquire the required amount of light for the signal transmission, thereby not transmitting a signal to the terminal 100.

Further, even if the location of the power source 104 of the terminal 100 corresponds to the location of the photovoltaic power source 114 of the bio-sensor 110, signal transmission efficiency may be deteriorated depending on the depth to which the bio-sensor 110 is inserted into a human body.

In order to address the above-described problems, three various embodiments according to the present disclosure will be presented as follows.

A first embodiment of the present disclosure presents a method in which a terminal controls an amount of light to transmit to a bio-sensor, based on an amount of light received from the bio-sensor. A second embodiment of the present disclosure presents a method in which a terminal controls an amount of light to transmit to a bio-sensor based on information on a reception area where a light signal is received. And a third embodiment of the present disclosure presents a method in which a terminal controls an amount of light to transmit to a bio-sensor using a timer.

In the above-described embodiments, the terminal may transmit, to the bio-sensor, a frame configured as Table 1 below.

TABLE 1

| Start flag | Control Info | Time slot #1 | . . . | Time slot #n |
|---|---|---|---|---|

In Table 1, "Start flag" represents a start of the frame, "Control Info" represents control information, and "Time slot #1" to "Time slot #n" represent time slots to which bio-data and related data which are to be transmitted are allocated. "Control info" may be configured as Table 2 below.

TABLE 2

| Syntax | size | notes |
|---|---|---|
| control _format{ | n bit | |
| Device_ID | n bit | Device -> Sensor |
| Sensor_ID } | n bit | Sensor -> Device |

In Table 2, "Device_ID" represents an Identifier (ID) of the terminal, and "Sensor_ID" represents an ID of the bio-sensor. In the first to third embodiments of the present disclosure, the terminal and the bio-sensor perform communication based on mutual ID information.

Hereinafter, the three embodiments of the present disclosure will be described in more detail.

Figure 2A:
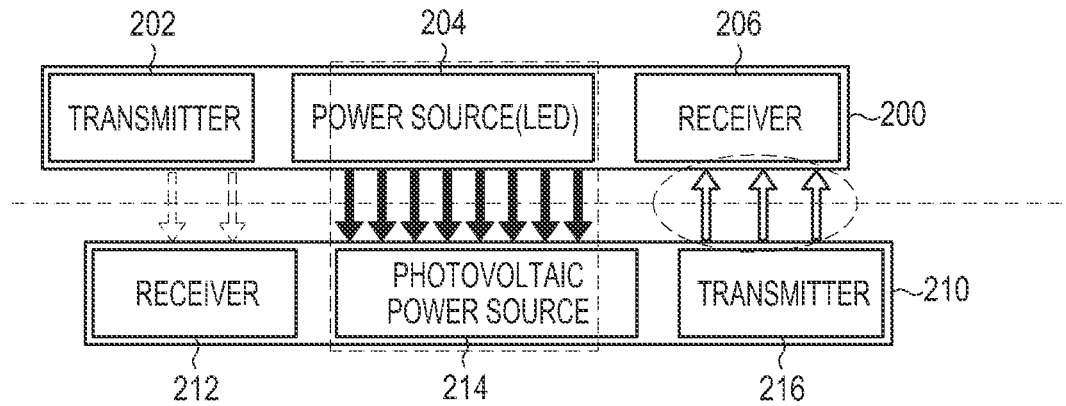
FIGS. 2A and 2B illustrate a method of controlling an amount of light according to a first embodiment of the present disclosure.
Figure 2B:
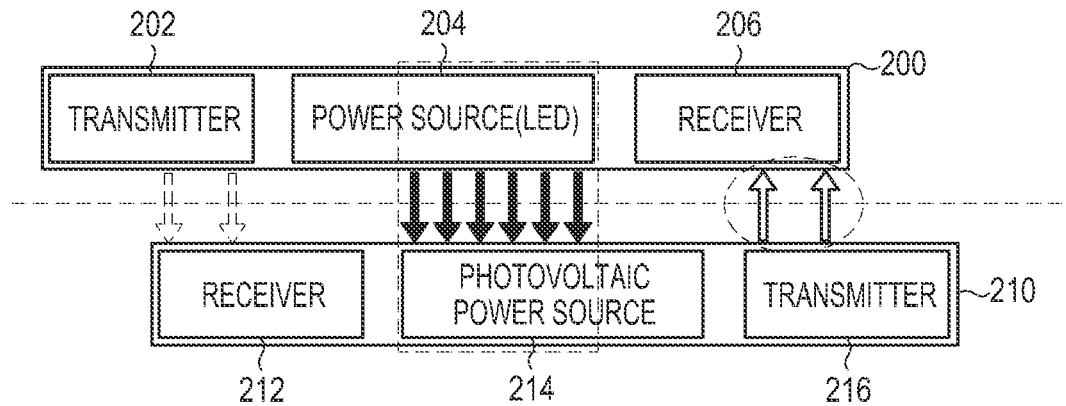

FIGS. 2A and 2B illustrate a method of controlling an amount of light according to the first embodiment of the present disclosure.

Referring to FIG. 2A, when a location of a power source 204 of a terminal 200 and a location of a photovoltaic power source 214 of a bio-sensor 210 correspond to each other as illustrated in FIG. 2A, and thereafter do not correspond to each other as illustrated in FIG. 2B, the photovoltaic power source 214 may not receive the entire light source signal transmitted from the power source 204. Thus, a transmitter 216 does not acquire a required amount of light so that signal transmission efficiency is deteriorated. That is, as with the example of FIGS. 1A and 1B, the highest throughput for the signal transmission/reception between the terminal 200 and the bio-sensor 210 may be achieved when locations of a transmitter 202, the power source 204, and a receiver 206 of the terminal 200 correspond to locations of a receiver 212, the photovoltaic power source 214, and the transmitter 216 of the bio-sensor 210 in one-to-one manner.

More specifically, the amount of light that the bio-sensor 210 can use is reduced, as the location of the power source 204 of the terminal 200 and the location of the photovoltaic power source 214 of the bio-sensor 210 do not correspond to each other. Thus, in the first embodiment of the present disclosure, the power source 204 of the terminal 200 is controlled to transmit a greater amount of light than an amount of previously transmitted light, based on whether an amount of light according to the light source signal received in a receiver 206 of the terminal 200 is less than a reference amount of light.

Hereinafter, operations of the terminal 200 and the bio-sensor 210 will be described in more detail.

Figure 3:
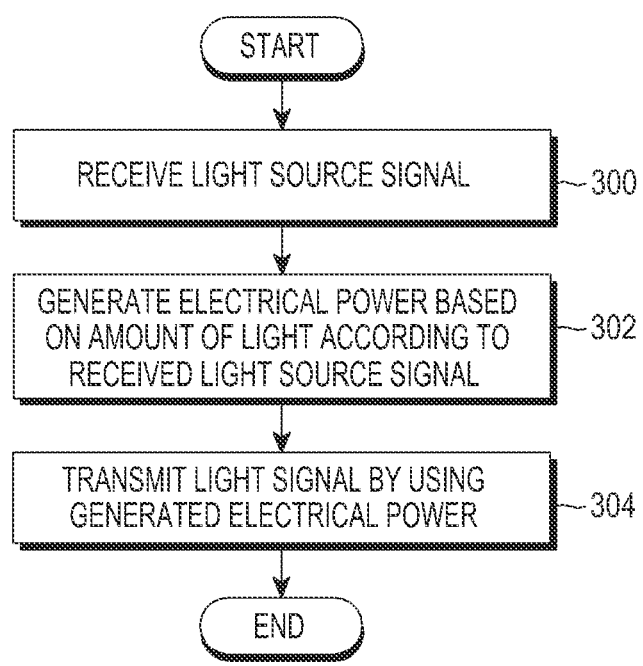
FIG. 3 is a flowchart illustrating a transmission operation of a bio-sensor according to the first embodiment of the present disclosure.

FIG. 3 is a flowchart illustrating a transmission operation of a bio-sensor according to the first embodiment of the present disclosure.

Referring to FIG. 3, in operation 300, the bio-sensor 210 receives a light source signal from the terminal 200. In operation 302, the bio-sensor 210 generates electrical power based on an amount of light according to the received light source signal. In operation 304, the bio-sensor 210 transmits a light signal using the generated electrical power.

As described above, the bio-sensor 210 receives the entire light source signal transmitted from the terminal 200 when the location of the bio-sensor 210 completely corresponds to the location of the terminal 200, but receives only some of the transmitted light source signal when the location of the bio-sensor 210 does not completely correspond to the location of the terminal 200. Since an acquirable amount of light is decreased when the bio-sensor 210 receives only some of the light source signal, the terminal 200 may control, through the following method, an amount of light to transmit to the bio-sensor 210 such that the decreased amount of light may be compensated.

Figure 4:
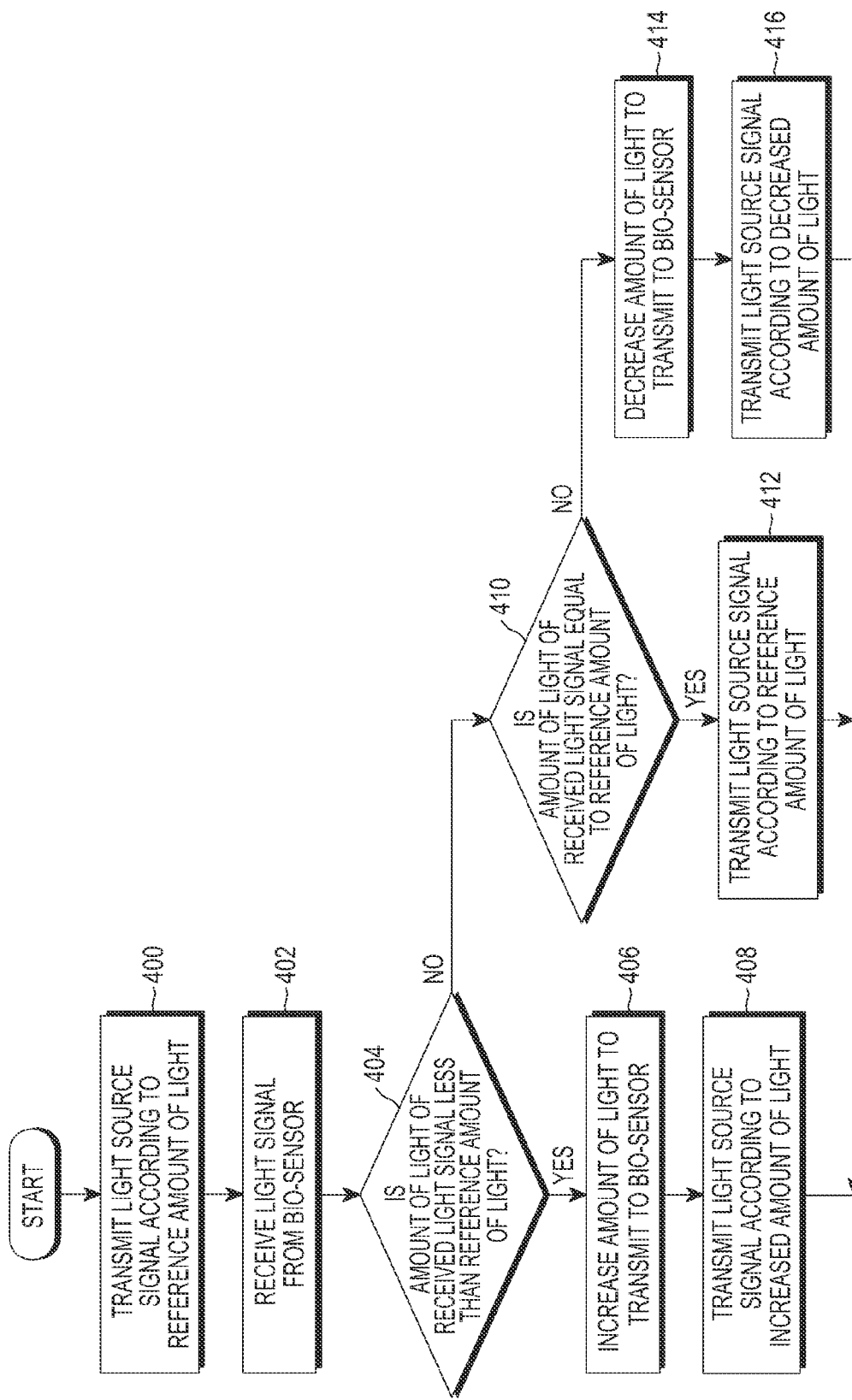
FIG. 4 is a flowchart illustrating operations of controlling an amount of light that a terminal is to transmit to the bio-sensor according to the first embodiment of the present disclosure.

FIG. 4 is a flowchart illustrating operations of controlling an amount of light that a terminal is to transmit to the bio-sensor according to the first embodiment of the present disclosure.

Referring to FIG. 4, the terminal 200 transmits a light source signal according to a reference amount of light, in operation 400. The terminal 200 receives a light signal from the bio-sensor 210, in operation 402, and determines, in operation 404, whether an amount of light of the received light signal is less than the reference amount of light.

When the amount of light of the received light signal is less than the reference amount of light, the terminal 200 proceeds to operation 406, and increases an amount of light to transmit to the bio-sensor 210. Thereafter, the terminal 200 transmits a light source signal according to the increased amount of light, in operation 408.

Meanwhile, when the amount of light of the received light signal is more than the reference amount of light, the terminal 200 proceeds to operation 410, and determines whether the amount of light of the received light signal is equal to the reference amount of light. When it is determined that the amount of light of the received light signal is equal to the reference amount of light, the terminal 200 proceeds to operation 412, and transmits a light source signal according to the reference amount of light. In this way, when the amount of light of the received light signal is equal to the reference amount of light, the amount of light to transmit to the bio-sensor 210 is not changed.

When it is determined in operation 410 that the amount of light of the received light signal is not equal to the reference amount of light, i.e., the amount of light of the received light signal is more than the reference amount of light, the terminal 200 proceeds to operation 414, and decreases the amount of light to transmit to the bio-sensor 210. Thereafter, the terminal 200 transmits a light source signal according to the decreased amount of light in operation 416.

As illustrated in FIG. 4, the terminal 200 controls the amount of light to transmit to the bio-sensor 210, based on the amount of received light. Hereinafter, an operation through which the terminal 200 may control an amount of transmitted light will be described with reference to FIG. 5.

Figure 5:
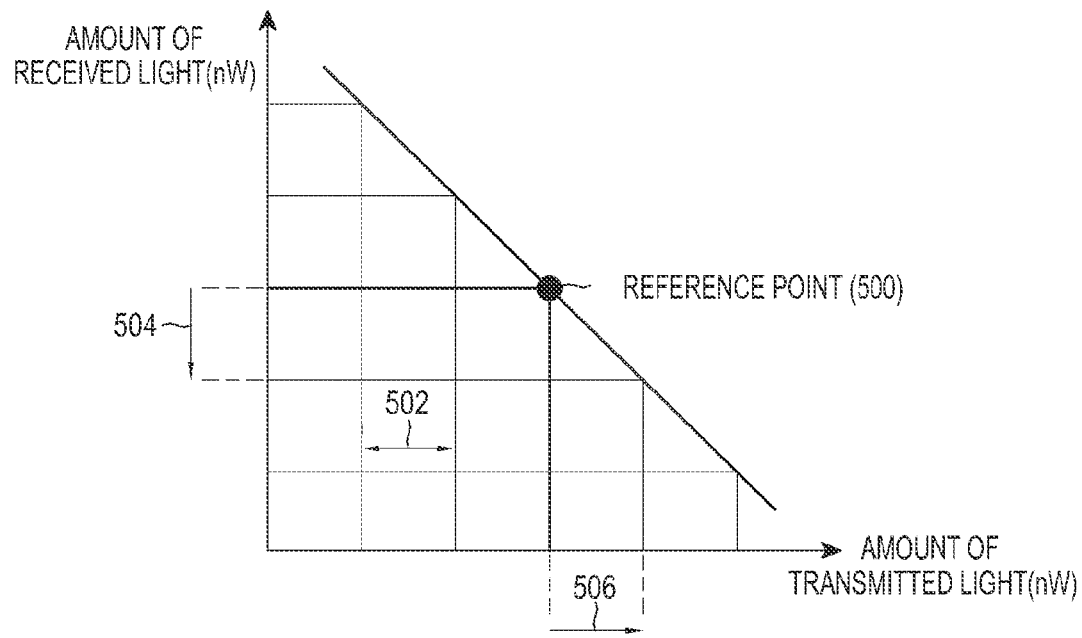
FIG. 5 is a graph illustrating a relationship between an amount of received light and an amount of transmitted light according to the first embodiment of the present disclosure.

FIG. 5 is a graph illustrating a relationship between an amount of received light and an amount of transmitted light according to the first embodiment of the present disclosure.

Referring to FIG. 5, the horizontal axis represents the amount of transmitted light of the terminal 200, and the vertical axis represents the amount of the light received from the bio-sensor 210. Referring to FIG. 5, the terminal 200 controls the amount of transmitted light based on a reference amount of light corresponding to a location of a reference point 500 on the graph. More specifically, the terminal 200 increases the amount of transmitted light when the amount of received light is less that the reference amount of light, and decreases the amount of transmitted light when the amount of received light is more than the reference amount of light.

The amount of transmitted light and the amount of received light may be measured in units of a basic amount of light 502 set in advance, and an increase or a decrease in the amount of transmitted light may be determined based on how much the amount of received light is increased or decreased as compared with the reference amount of light. For example, as illustrated in FIG. 5, when the amount of received light is decreased by one unit of a basic amount of light 504 as compared with the reference amount of light 500, the amount of transmitted light may be further increased by one unit of a basic amount of light 506 over the reference amount of light 500.

Further, when the amount of received light is decreased by two or more units of the basic amount of light as compared with the reference amount of light 500, the amount of transmitted light may be further increased by two or more units of the basic amount of light over the reference amount of light 500. Consequently, the increase or decrease in the amount of transmitted light may be determined to correspond to a difference between the amount of received light and the reference amount of light 500.

Figure 6:
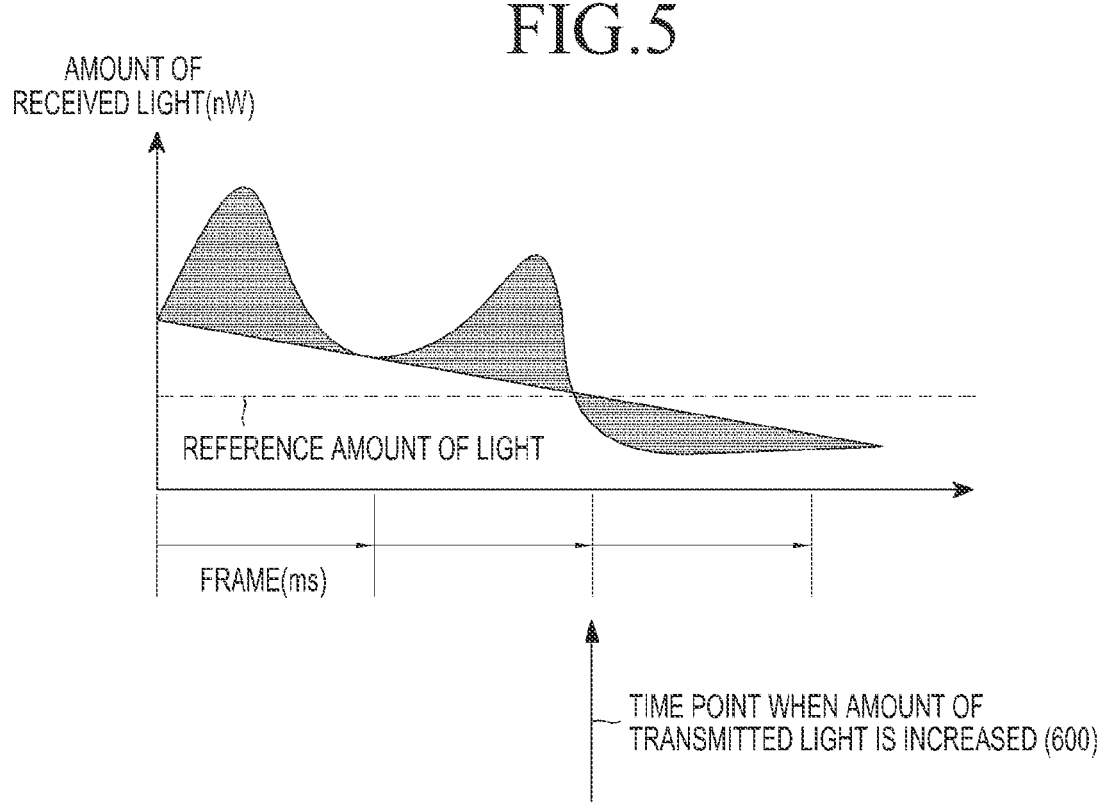
FIG. 6 is a graph illustrating control sections depending on a variation in an amount of received light according to the first embodiment of the present disclosure.

FIG. 6 is a graph illustrating control sections depending on a variation in an amount of received light according to the first embodiment of the present disclosure.

Referring to FIG. 6, the horizontal axis represents frame sections, a vertical axis represents an amount of received light, and a dotted line represents a reference amount of light. When the above-described method of controlling the amount of transmitted light according to the first embodiment of the present disclosure is to be used, a time point 600 when the amount of transmitted light is increased may be determined to correspond to a time point when the amount of received light is decreased, as illustrated in FIG. 6. Thus, even when the location of the terminal 200 does not completely correspond to the location of the bio-sensor 210 (or, even when the bio-sensor 210 is inserted into a human body by a depth of a threshold value or larger), communication between the terminal 200 and the bio-sensor 210 may be smoothly performed according to the first embodiment of the present disclosure.

Next, a method of controlling an amount of transmitted light according to the second embodiment of the present disclosure will be described.

Figure 7A:
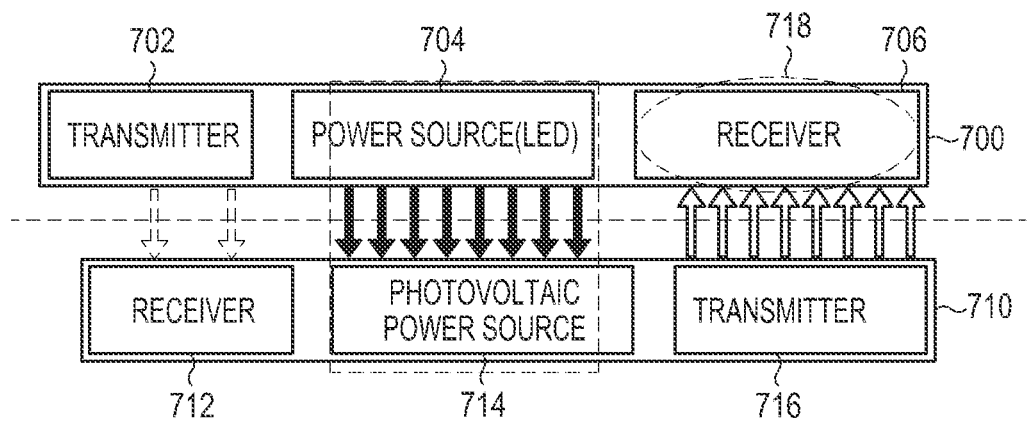
FIGS. 7A and 7B illustrate a method of controlling an amount of light according to a second embodiment of the present disclosure.
Figure 7B:
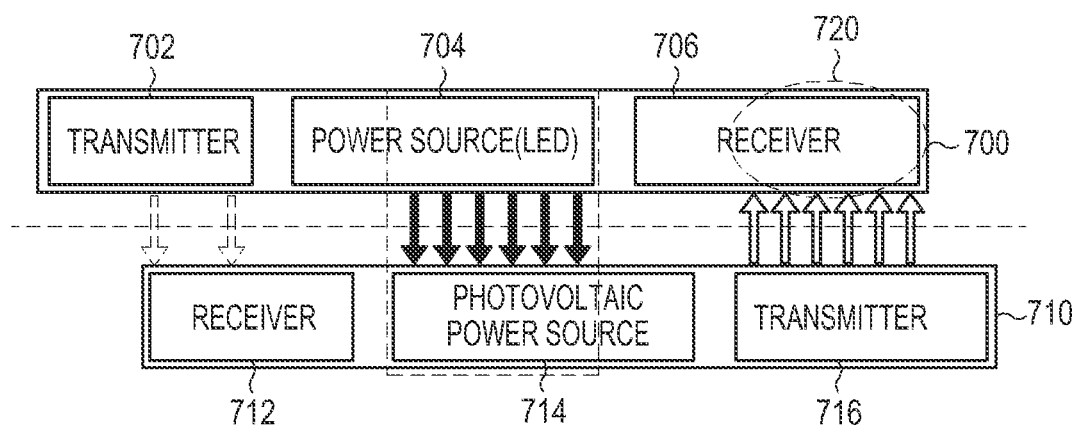

FIGS. 7A and 7B illustrate the method of controlling the amount of light according to the second embodiment of the present disclosure.

Referring to FIG. 7A, when locations of a transmitter 702, a power source 704, and a receiver 706 of a terminal 700 correspond to locations of a receiver 712, a photovoltaic power source 714, and a transmitter 716 of a bio-sensor 710, a light signal that the transmitter 716 has transmitted is received in the entire reception area 718 in which the receiver 706 can receive a signal.

However, referring to FIG. 7B, when the locations of the transmitter 702, the power source 704, and the receiver 706 of the terminal 700 do not correspond to the locations of the receiver 712, the photovoltaic power source 714, and the transmitter 716 of the bio-sensor 710, the light signal that the transmitter 716 has transmitted is received only in some of the reception area 720 of the receiver 706.

This means that the locations of the internal configurations of the terminal 700 and the bio-sensor 710 do not correspond to each other, and consequently implies that the bio-sensor 710 does not acquire the entire amount of light which the power source 704 has transmitted.

Thus, the second embodiment of the present disclosure proposes a method in which the terminal 700 controls an amount of light to transmit to the bio-sensor 710, based on information on an area where a light signal is received. An operation of the bio-sensor 710 proposed in the second embodiment of the present disclosure is substantially the same as the operation of the bio-sensor 210 proposed in the first embodiment of the present disclosure, and therefore will not be described.

Hereinafter, an operation of the terminal 700 proposed in the second embodiment of the present disclosure will be described with reference to FIG. 8.

Figure 8:
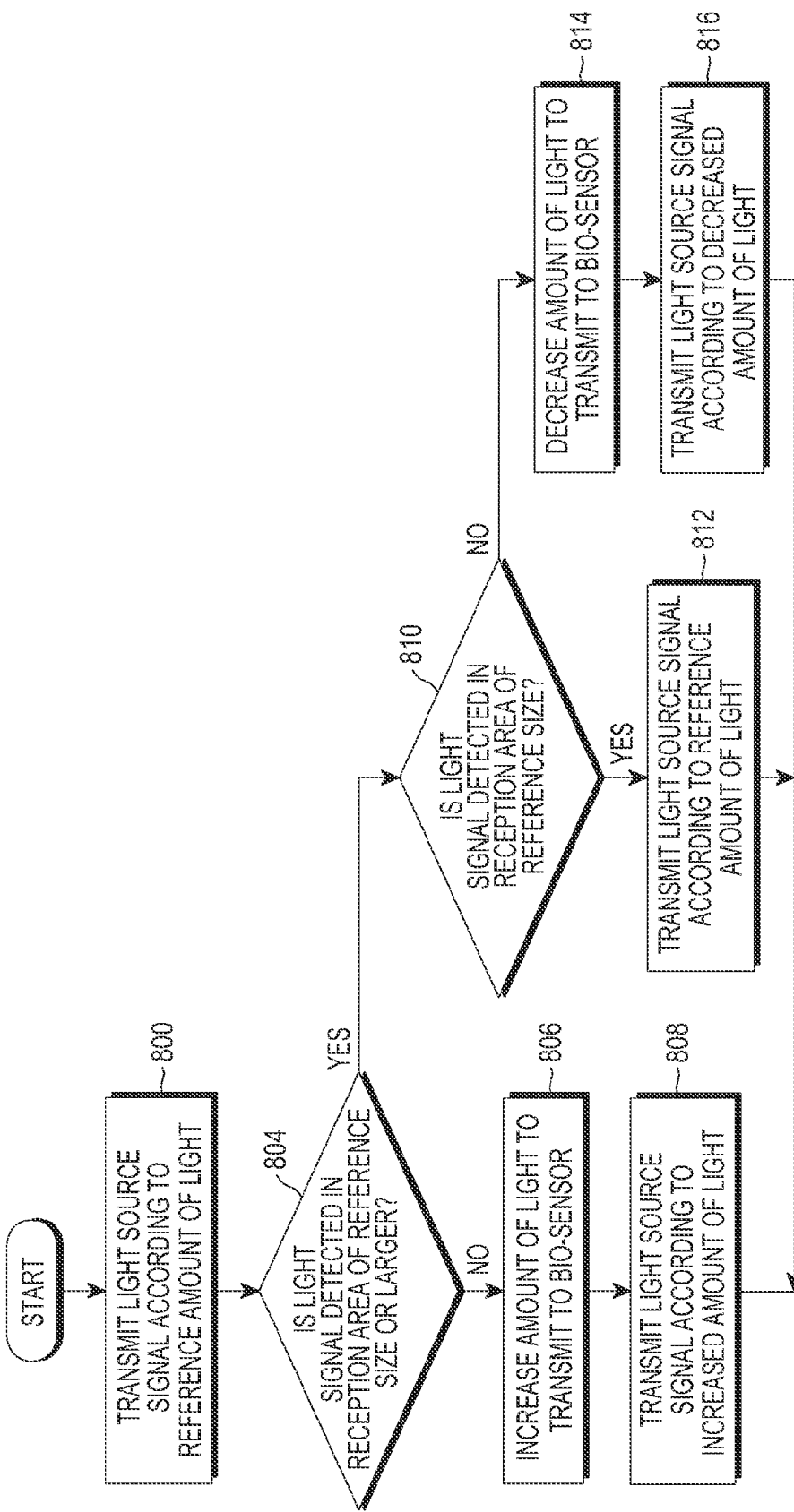
FIG. 8 is a flowchart illustrating operations of controlling an amount of light that a terminal is to transmit to a bio-sensor according to the second embodiment of the present disclosure.

FIG. 8 is a flowchart illustrating operations of controlling an amount of light that a terminal is to transmit to a bio-sensor according to the second embodiment of the present disclosure.

Referring to FIG. 8, in operation 800, the terminal 700 transmits a light source signal according to a reference amount of light. In operation 804, the terminal 700 determines whether a light signal received from the bio-sensor 710 is detected in a reception area of a reference size or larger.

When it is determined in operation 804 that the received light signal has not been detected in the reception area of the reference size or larger, namely, the received light signal has been detected in a reception area smaller than the reference size, the terminal proceeds to operation 806, and increases an amount of light to transmit to the bio-sensor 710. Thereafter, in operation 808, the terminal 700 transmits a light source signal according to the increased amount of light.

Meanwhile, when it is determined in operation 804 that the received light signal has been detected in the reception area of the reference size or larger, the terminal 700 proceeds to operation 810, and determines whether the light signal has been detected in the reception area of the reference size. When it is determined that the light signal has been detected in the reception area of the reference size, the terminal 700 transmits a light source signal according to the reference amount of light, in operation 812.

When it is determined in operation 810 that the light signal has not been detected in the reception area of the reference size, namely, the light signal has been detected in the reception area larger than the reference size, the terminal proceeds to operation 814, and decreases an amount of light to transmit to the bio-sensor 710. Thereafter, in operation 816, the terminal 700 transmits a light source signal according to the decreased amount of light.

As illustrated in FIG. 8, in the second embodiment of the present disclosure, the terminal 700 controls the amount of light to transmit to the bio-sensor 710, based on the information on the reception area where the light signal has been detected. Hereinafter, an operation through which the terminal 700 controls an amount of transmitting light will be described with reference to FIG. 9.

Figure 9:
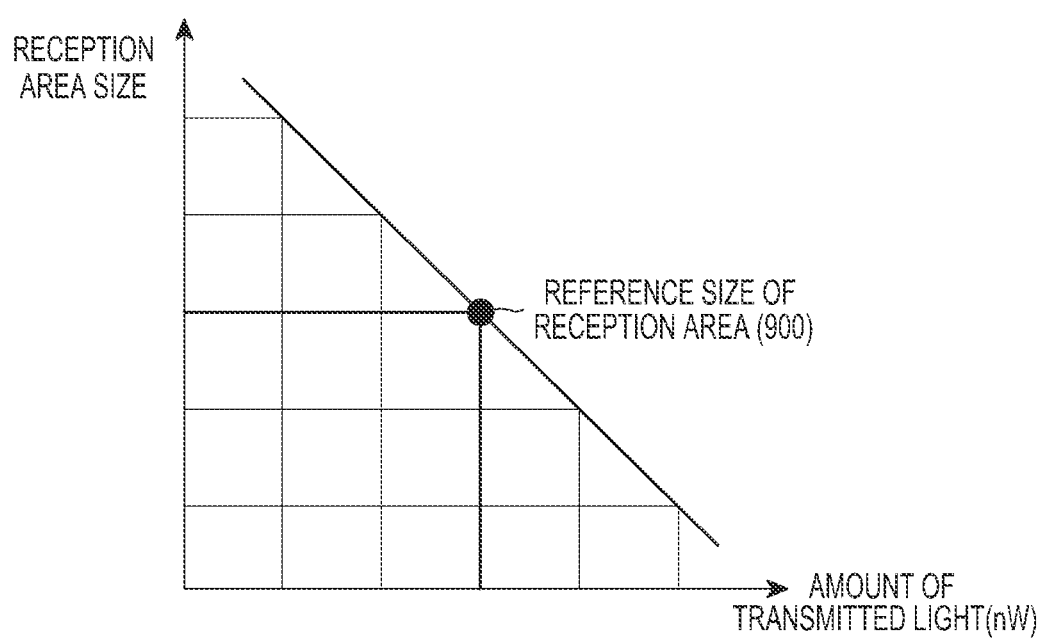
FIG. 9 is a graph illustrating a relationship between a size of a reception area where a light signal is detected and an amount of transmitted light according to the second embodiment of the present disclosure.

FIG. 9 is a graph illustrating a relationship between a size of a reception area where a light signal is detected and an amount of transmitted light according to the second embodiment of the present disclosure.

Referring to FIG. 9, the horizontal axis represents the amount of transmitted light of the terminal 700, and the vertical axis represents the size of the reception area where the light signal is detected. The amount of transmitted light is decreased as the size of the reception area where the light signal is detected becomes larger, and is increased as the size of the reception area where the light signal is detected becomes smaller.

The terminal 700 may control the amount of transmitted light based on a reference size 900 of the reception area. For example, the terminal 700 may increase the amount of transmitted light when a size of the reception area where the light signal is detected is smaller than the reference size 900, and may decrease the amount of transmitted light when a size of the reception area where the light signal is detected is larger than the reference size 900.

At this time, an increase/decrease in the amount of transmitted light may be determined depending on how much larger or smaller the size of the reception area where the light signal is detected is than the reference size 900, and the size of the reception area may be measured based on a basic unit set in advance.

For example, as illustrated in FIG. 9, when the size of the reception area is decreased by one basic size compared to the reference size 900, the amount of transmitted light may be increased by one basic unit of an amount of light to correspond to the decreased size of the reception area. Further, when the size of the reception area is increased by one basic size compared to the reference size 900, the amount of transmitted light may be decreased by one basic unit of an amount of light to correspond to the increased size of the reception area.

Lastly, a method of controlling an amount of transmitted light according to the third embodiment of the present disclosure will be described.

Figure 10A:
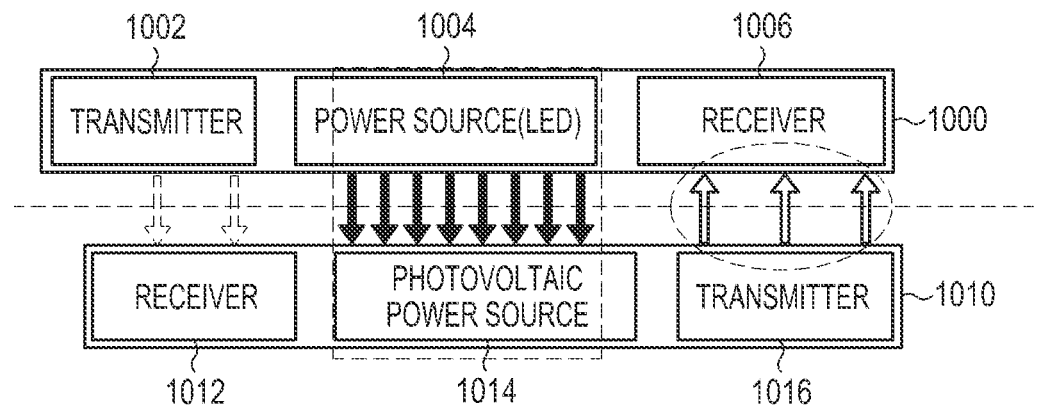
FIGS. 10A and 10B illustrate a method of controlling an amount of light according to a third embodiment of the present disclosure.
Figure 10B:
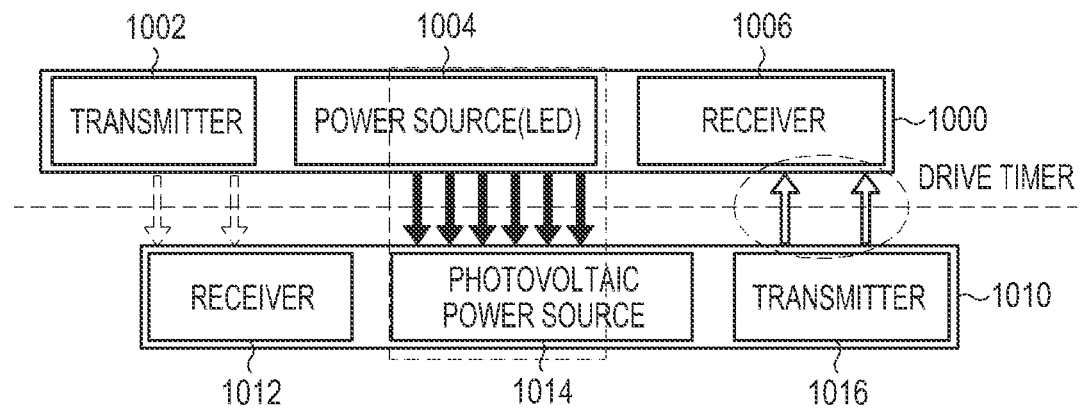

FIGS. 10A and 10B illustrate a method of controlling an amount of light according to a third embodiment of the present disclosure.

Referring to FIG. 10A, a light signal is transmitted from a transmitter 1016 in a state where locations of a transmitter 1002, a power source 1004, and a receiver 1006 of a terminal 1000 correspond to locations of a receiver 1010, a photovoltaic power source 1014, and the transmitter 1016 of a bio-sensor 1010. However, as illustrated in FIG. 10B, the locations of the transmitter 1002, the power source 1004, and the receiver 1006 of the terminal 1000 may not correspond to the locations of the receiver 1012, the photovoltaic power source 1014, and the transmitter 1016 of the bio-sensor 1010.

At this time, the locations of the internal configurations of the terminal 1000 and the bio-sensor 1010 may not correspond to each other continuously or to a serious degree. Thus, in the third embodiment of the present disclosure, an amount of transmitted light of the terminal 1000 is controlled through detecting, based on an amount of received light of the terminal 1000, a time point when the locations of the internal configurations of the terminal 1000 and the bio-sensor 1010 do not correspond to each other. The terminal 1000 drives a timer at a time point when the amount of received light becomes less than a reference amount of light, and determines the amount of received light at a time point when the timer expires. The terminal 1000 increases the amount of transmitting light when the determined amount of received light is still less than the reference amount of light (or when the determined amount of received light is less than an amount of previously received light).

Hereinafter, a process of controlling an amount of transmitted light, proposed in the third embodiment of the present disclosure, will be described with reference to FIG. 11.

Figure 11:
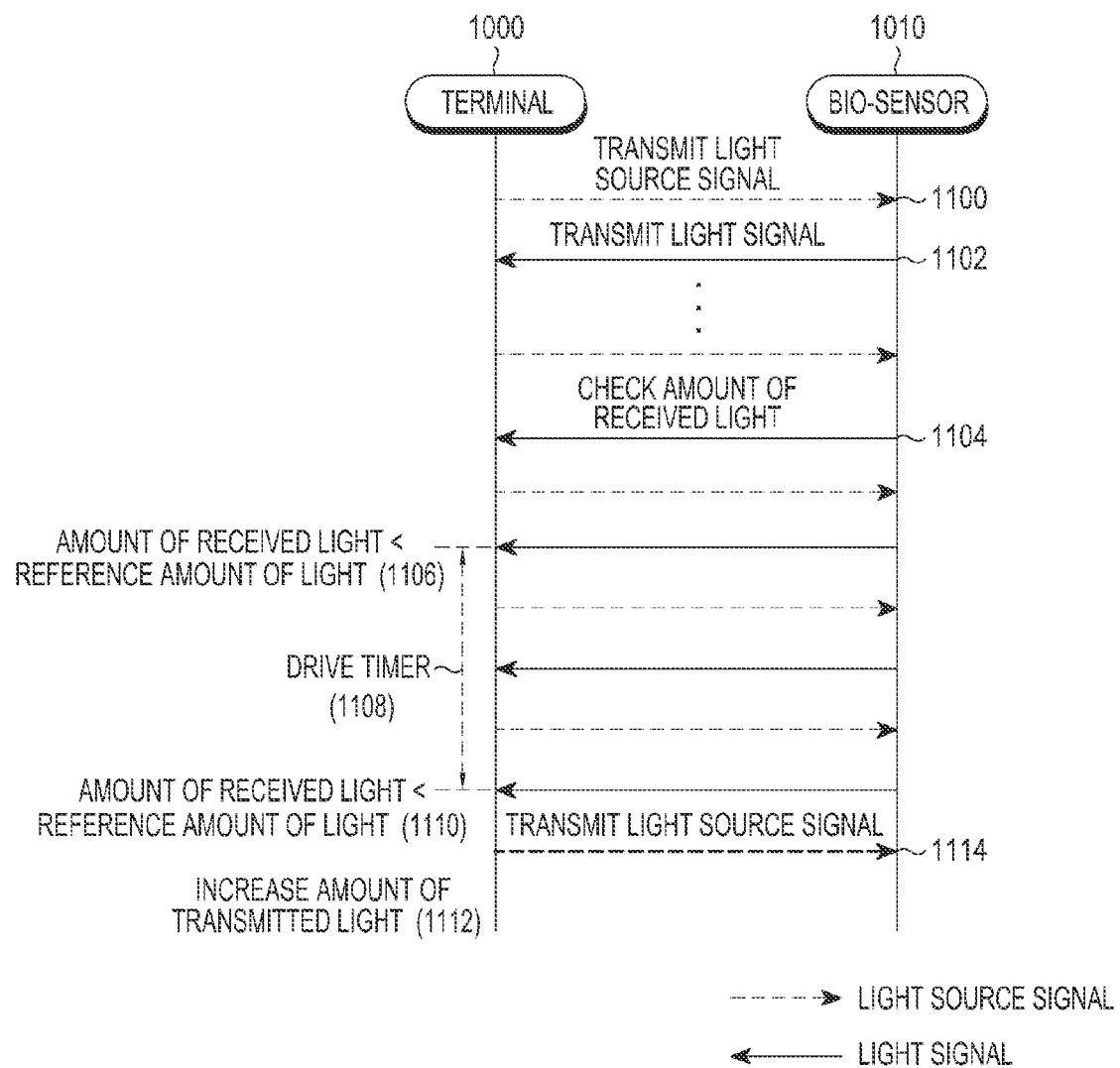
FIG. 11 is a signal flow diagram illustrating a process of controlling an amount of transmitted light according to the third embodiment of the present disclosure.

FIG. 11 is a signal flow diagram illustrating a process of controlling the amount of transmitted light according to a third embodiment of the present disclosure.

Referring to FIG. 11, in operation 1100, the terminal 1000 transmits a light source signal to the bio-sensor 1010. In operation 1102, the bio-sensor 1010 transmits a light signal to the terminal 1000. The transmission/reception of the light source signal and the light signal may be repeatedly performed.

Meanwhile, in operation 1104, the terminal 1000 determines an amount of received light according to the received light signal. The determining of the amount of received light may be performed at a specific time point set in advance or periodically. When it is determined in operation 1106 that the determined amount of received light is less than a reference amount of light, the terminal 1000 drives a timer having a time set in advance, in operation 1108.

When the timer is ended, the terminal 1000 determines the amount of received light once more. When it is determined in operation 1110 that the re-determined amount of received light is less than the reference amount of light, the terminal 1000 increases an amount of transmitted light in operation 1112. The terminal 1000 may increase the amount of transmitted light by an amount of light corresponding to a difference between the reference amount of light and the amount of transmitted light, and, for example, may increase the amount of transmitted light through a method similar to the method proposed in the first embodiment of the present disclosure.

The terminal 1000 increases the amount of transmitted light as described above, and transmits a light signal according to the increased amount of transmitted light to the bio-sensor 1010, in operation 1114.

Hereinafter, an operation of the terminal 1000 will be described with reference to FIGS. 12A and 12B. An operation of the bio-sensor 1010 proposed in the third embodiment of the present disclosure is substantially the same as the operation of the bio-sensor 210 proposed in the first embodiment of the present disclosure, and therefore will not be described.

Figure 12A:
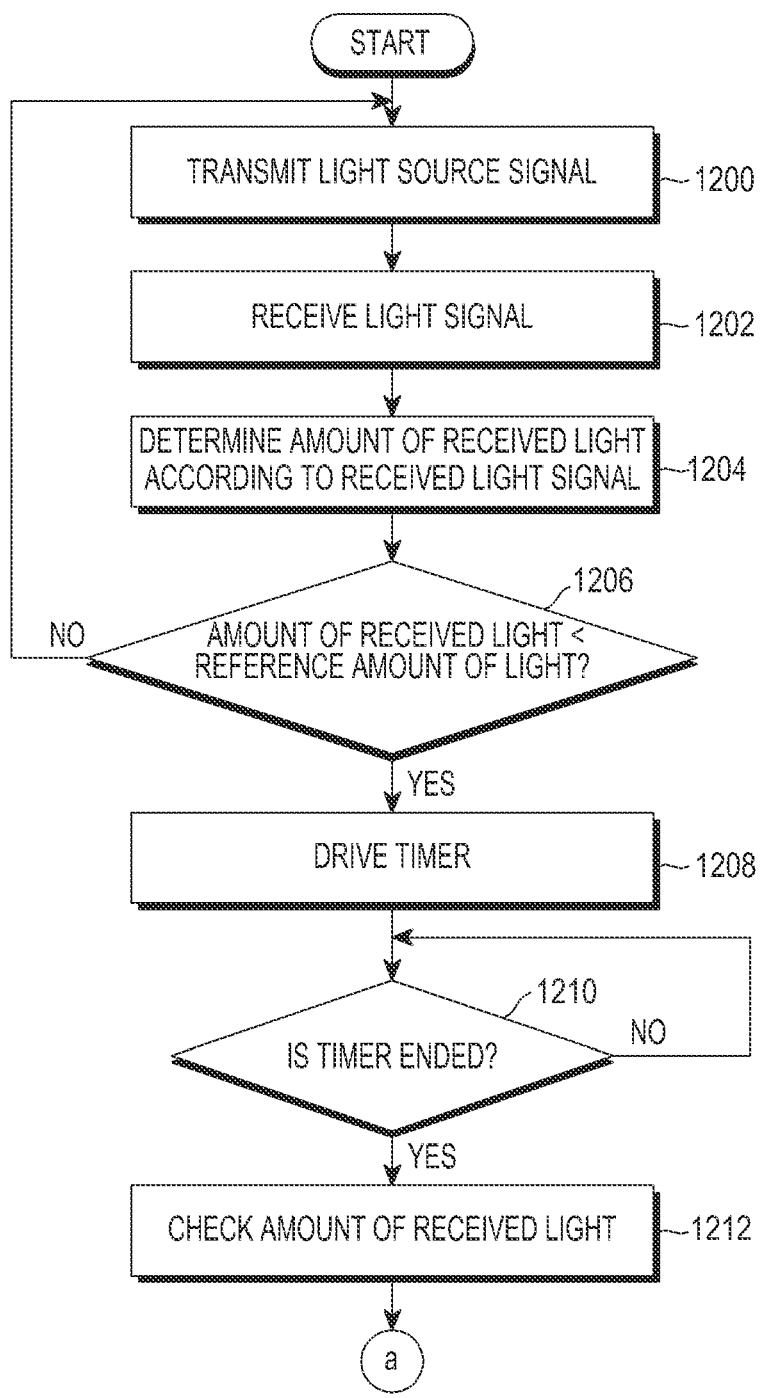
FIGS. 12A and 12B are flowcharts illustrating an operation through which a terminal controls an amount of light to transmit to a bio-sensor according to the third embodiment of the present disclosure.
Figure 12B:
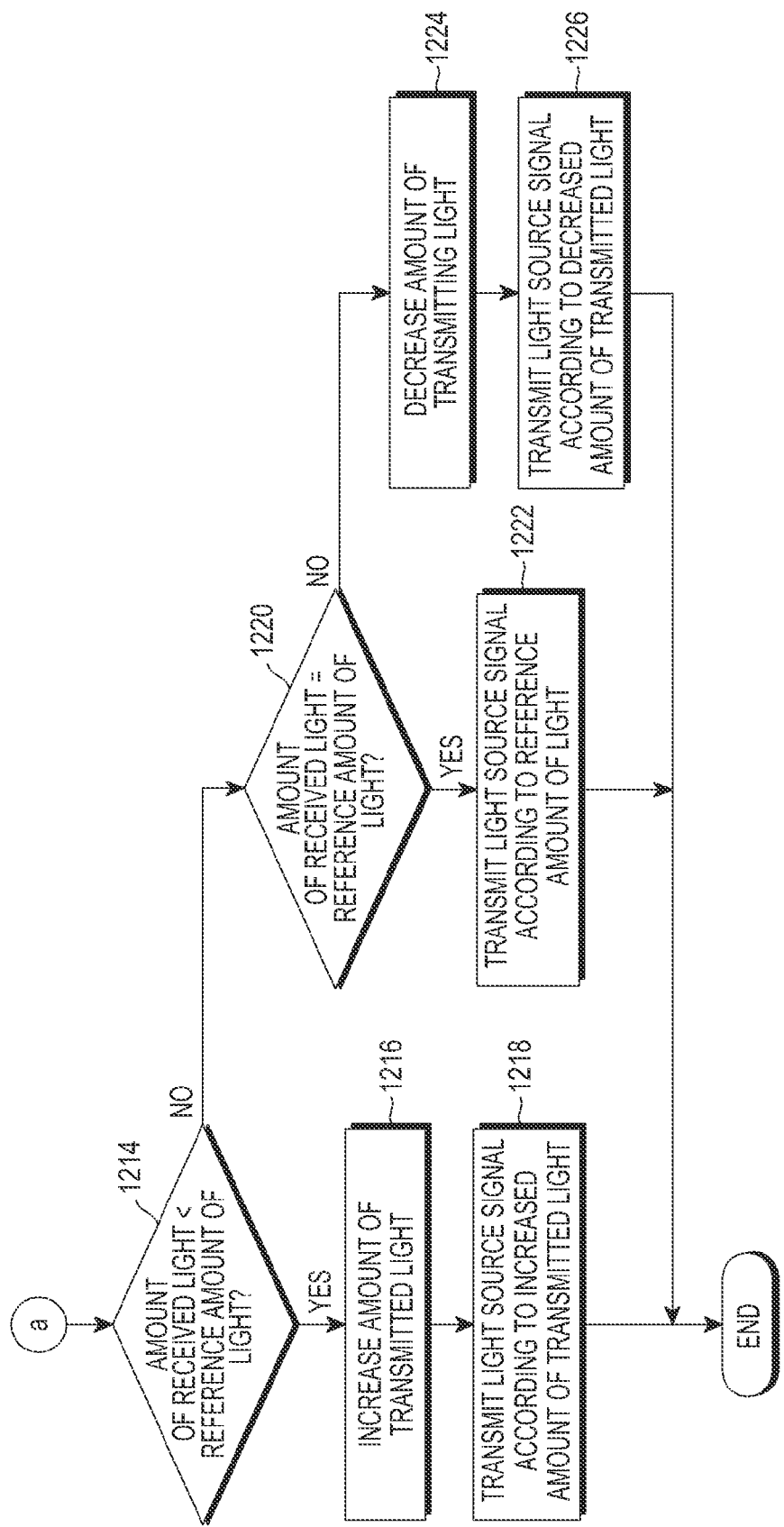

FIGS. 12A and 12B are flowcharts illustrating an operation through which a terminal controls an amount of light to transmit to a bio-sensor according to the third embodiment of the present disclosure.

Referring to FIG. 12A, the terminal transmits a light source signal to the bio-sensor 1010, in operation 1200. The terminal 1000 receives a light signal from the bio-sensor 1010, in operation 1202, and determines an amount of received light according to the received light signal, in operation 1204.

When it is determined in operation 1206 that the determined amount of received light is less than a reference amount of light, the terminal 1000 proceeds to operation 1208, and drives a timer. The terminal 1000 determines in operation 1210 whether the timer has ended, and determines the amount of received light, in operation 1212, when the timer has ended.

Referring to FIG. 12B illustrating operations after operation 1212 of FIG. 12A, when it is determined in operation 1214 that the amount of received light is less than the reference amount of light, the terminal 1000 proceeds to operation 1216, and increases an amount of transmitted light. In addition, the terminal 1000 transmits a light source signal according to the increased amount of received light, in operation 1218.

Meanwhile, when it is determined in operation 1214 that the amount of received light is more than or equal to the reference amount of light, the terminal 1000 proceeds to operation 1220, and determines whether the amount of received light is equal to a threshold value. When it is determined that the amount of received light is equal to the threshold value, the terminal proceeds to operation 1222, and transmits a light source signal according to an existing amount of transmitted light. That is, the terminal 1000 does not change the amount of transmitted light.

When it is determined in operation 1220 that the amount of received light is not equal to the reference amount of light, namely, the amount of received light is more than the threshold value, the terminal proceeds to operation 1224, and decreases an amount of transmitted light. Thereafter, the terminal 1000 transmits a light source signal according to the decreased amount of transmitted light in operation 1226.

As described above, the third embodiment of the present disclosure may be applied to be used in the above-described first embodiment of the present disclosure. Although not illustrated in the drawings, the third embodiment of the present disclosure may also be applied to the above-described second embodiment of the present disclosure.

In other words, instead of the operations of comparing the amount of received light with the reference amount of light in FIGS. 11, 12A, and 12B, an operation of controlling an amount of transmitted light using a timer according to whether a light signal received from a bio-sensor is detected in a reception area smaller than a reference size may be performed. More specifically, the terminal may drive the timer when the light signal received from the bio-sensor is detected in the reception area smaller than the reference size, and may increase the amount of transmitted light when the light signal received from the bio-sensor is detected in the reception area smaller than the reference size even after the timer is ended. Further, the terminal may decrease the amount of transmitted light when the light signal received from the bio-sensor is detected in the reception area larger than the reference size after the timer is ended.

As described above, according to the first to third embodiments of the present disclosure, a throughput for the signal transmission/reception between the terminal and the bio-sensor can be increased, and efficiency of the signal transmission/reception can also be enhanced.

In the first to third embodiments of the present disclosure, the internal configurations (i.e., the transmitter, the power source, and the receiver) of the terminal and the internal configurations (i.e., the receiver, the photovoltaic power source, and the transmitter) of the bio-sensor have been arranged in a line, respectively. However, the internal configurations may be included in other various forms in the terminal and the bio-sensor, and the methods according to the first to third embodiments of the present disclosure may also be used in this case.

Hereinafter, an example of internal configurations of a terminal and a bio-sensor according to an embodiment of the preset disclosure will be described. The internal configurations of the terminal and the bio-sensor, which will be described below, may perform operations functionally similar to those of the internal configurations previously described in the first to third embodiments of the present disclosure.

Figure 13A:
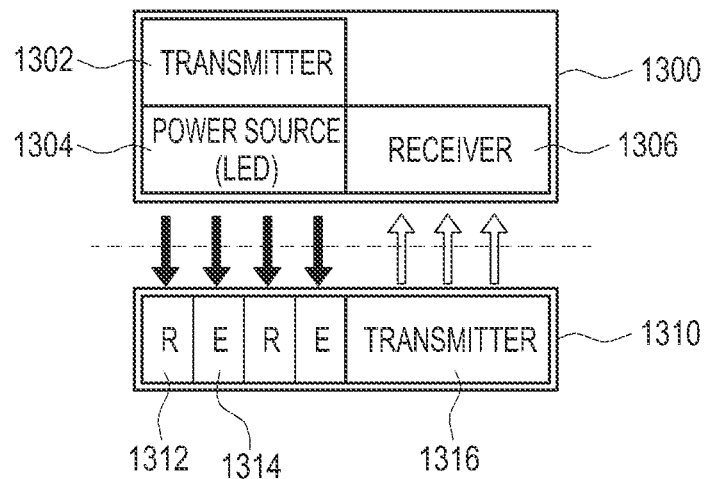
FIGS. 13A and 13B illustrate examples of internal configurations of a terminal and a bio-sensor according to embodiments of the present disclosure.
Figure 13B:
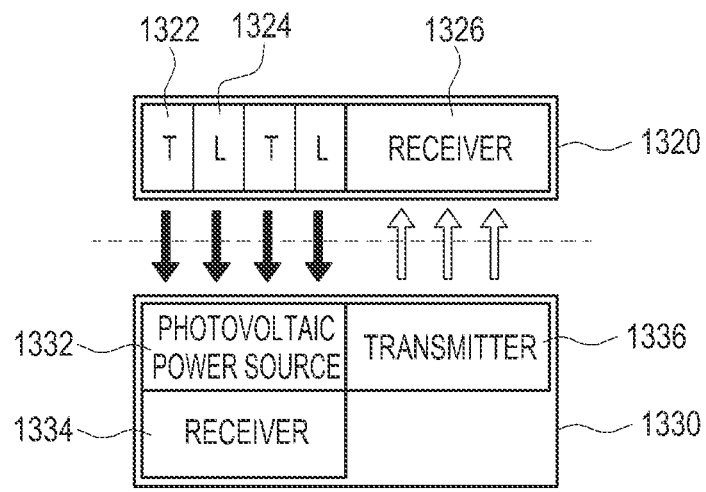

FIGS. 13A and 13B illustrate examples of internal configurations of a terminal and a bio-sensor according to embodiments of the present disclosure.

Referring to FIG. 13A, the terminal 1300 includes a transmitter 1302, a power source 1304, and a receiver 1306. The transmitter 1302 may be located at an upper end (or a lower end) of the power source 1304. Thus, the transmitter 1302 and the power source 1304 may transmit a preparatory signal and a light source signal, respectively, at the same location.

The bio-sensor 1310 includes receivers 1312, photovoltaic power sources 1314, and a transmitter 1316. The receivers 1312 and the photovoltaic power sources 1314 may be arranged to be alternately located.

FIG. 13B illustrates internal configurations of a terminal 1320 and a bio-sensor 1330, which are configured in a form reverse to that illustrated in FIG. 13A.

Referring to FIG. 13B, the terminal 1320 includes transmitters 1322, power sources 1324, and a receiver 1326. The transmitters 1322 and the power sources 1324 may be arranged to be alternately located.

Meanwhile, the bio-sensor 1330 includes a photovoltaic power source 1332, a receiver 1334 and a transmitter 1336. The receiver 1334 may be located at a lower end (or an upper end) of the photovoltaic power source 1332. Thus, the receiver 1334 and the photovoltaic power source 1332 may receive the preparatory signal and the light source signal, respectively, at the same location.

Figure 14:
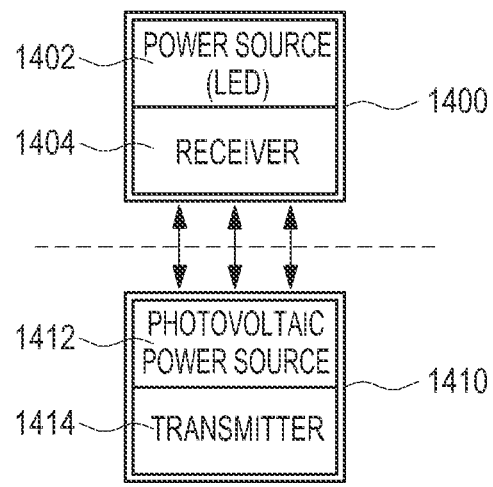
FIG. 14 is a block diagram illustrating another example of internal configurations of a terminal and a bio-sensor according to an embodiment of the present disclosure.

FIG. 14 is a block diagram illustrating another example of internal configurations of a terminal and a bio-sensor according to an embodiment of the present disclosure.

Referring to FIG. 14, the terminal 1400 includes a power source 1402 and a receiver 1404. The power source 1402 may integrally perform functions of the transmitter and the power source in the above-described terminal. For example, the power source 1402 may transmit both a preparatory signal and a light source signal. The power source 1402 may be arranged in a line at an upper end (or a lower end) of the receiver 1404. Thus, the terminal 1400 may transmit/receive signals at the same location.

The bio-sensor 1410 includes a photovoltaic power source 1412 and a transmitter 1414. The photovoltaic power source 1412 may integrally perform functions of the receiver and the power source in the above-described bio-sensor. For example, the photovoltaic power source 1412 may receive both the preparatory signal and the light source signal. The photovoltaic power source 1412 may be arranged in a line at an upper end (or a lower end) of the transmitter 1414. Thus, the bio-sensor 1410 may transmit/receive signals at the same location.

Figure 15:
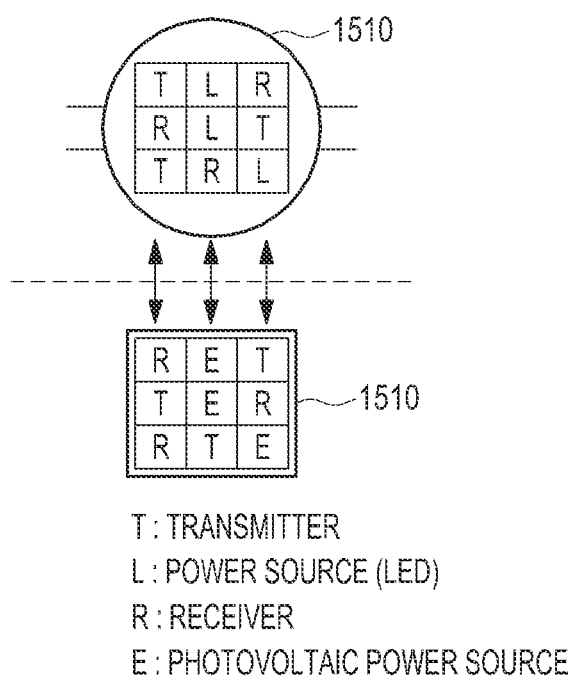
FIG. 15 is a block diagram illustrating another example of internal configurations of a terminal and a bio-sensor according to an embodiment of the present disclosure.

FIG. 15 is a block diagram illustrating another example of internal configurations of a terminal and a bio-sensor according to an embodiment of the present disclosure.

Referring to FIG. 15, a plurality of internal configurations may be included in the form of an array in the terminal 1500 and the bio-sensor 1510. Specifically, a plurality of transmitters, power sources, and receivers may be included in the terminal 1500, and a plurality of receivers, photovoltaic power sources, and transmitters may be included in the bio-sensor 1510.

Even though the internal configurations of the terminal and the bio-sensor are arranged as illustrated in FIGS. 13A to 15, throughput reduction occurring as the locations of the configurations that do not correspond to each other may be addressed when the methods according to the first to third embodiments of the present disclosure are used.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling an amount of light by a terminal in a visible light communication system, the method comprising:
receiving a light signal from a sensor;
determining whether an amount of light for the light signal is less than a threshold value or determining whether the light signal is detected in a reception area smaller than a reference size;
increasing an amount of light for a light source signal to transmit to the sensor when the amount of light for the light signal is less than the threshold value or the light signal is detected in the reception area smaller than the reference size; and
transmitting, to the sensor, a light source signal according to the increased amount of light.

2. The method of claim 1, further comprising:
decreasing the amount of light for the light source signal to transmit to the sensor when the measured amount of light is more than the threshold value.

3. The method of claim 1, wherein the increasing of the amount of light comprises:
increasing the amount of light for the light source signal to transmit to the sensor by an amount of light corresponding to a difference between the threshold value and the measured amount of light.

4. The method of claim 1, wherein the increasing of the amount of light comprises:
driving a timer when the measured amount of light is less than the threshold value;
measuring the amount of light for the light signal received from the sensor after the timer is ended;
increasing the amount of light for the light source signal to transmit to the sensor when the amount of light measured after the timer is ended is less than the threshold value; and
decreasing the amount of light for the light source signal to transmit to the sensor when the amount of light measured after the timer is ended is more than the threshold value.

5. The method of claim 1, further comprising:
decreasing the amount of light for the light source signal to transmit to the sensor, when the light signal received from the sensor is detected in a reception area larger than the reference size.

6. The method of claim 1, wherein the increasing of the amount of light comprises:
increasing the amount of light for the light source signal to transmit to the sensor by an amount of light corresponding to a difference between the reference size and the reception area size.

7. The method of claim 1, wherein the increasing of the amount of light comprises;
driving a timer when the light signal received from the sensor is detected in the reception area smaller than the reference size;
increasing the amount of light for the light source signal to transmit to the sensor when the light signal received from the sensor is detected in the reception area smaller than the reference size after the timer is ended; and decreasing the amount of light for the light source signal to transmit to the sensor when the light signal received from the sensor is detected in a reception area larger than the reference size after the timer is ended.

8. A terminal in a visible light communication system, the terminal comprising:

a receiver configured to receive a light signal from a sensor;

a controller configured to determine whether an amount of light for the light signal is less than a threshold value or determine whether the light signal is detected in a reception area smaller than a reference size, and to increase an amount of light for a light source signal to transmit to the sensor when the amount of light for the light signal is less than the threshold value or the light signal is detected in the reception area smaller than the reference size; and a power source configured to transmit, to the sensor, a light source signal according to the increased amount of light.

9. The terminal of claim 8, wherein the controller is further configured to decrease the amount of light for the light source signal to transmit to the sensor when the measured amount of light is more than the threshold value.

10. The terminal of claim 8, wherein the controller is further configured to increase the amount of light for the light source signal to transmit to the sensor by an amount of light corresponding to a difference between the threshold value and the measured amount of light.

11. The terminal of claim 8, wherein the controller is further configured to drive a timer when the measured amount of light is less than the threshold value, to measure the amount of light for the light signal received from the sensor after the timer is ended, to increase the amount of light for the light source signal to transmit to the sensor when the amount of light measured after the timer is ended is less than the threshold value, and to decrease the amount of light for the light source signal to transmit to the sensor when the amount of light measured after the timer is ended is more than the threshold value.

12. The terminal of claim 8, wherein the receiver and the power source are arranged in a line in a left-and-right direction or in an up-and-down direction in the terminal.

13. The terminal of claim 8, further comprising:

a transmitter configured to transmit, to the sensor, a preparatory signal representing that the light source signal according to the increased amount of light is to be transmitted, wherein in a case where there are a plurality of transmitters, receivers, and power sources, the plurality of transmitters, receivers, and power sources are arranged in an N×M array or to be alternately located, and N and M are integers greater than 1.

14. The terminal of claim 8, wherein the controller is further configured to decrease the amount of light for the light source signal to transmit to the sensor, when the light signal received from the sensor is detected in a reception area larger than the reference size.

15. The terminal of claim 8, wherein the controller is further configured to increase the amount of light for the light source signal to transmit to the sensor by an amount of light corresponding to a difference between the reference size and the reception area size.

16. The terminal of claim 8, wherein the controller is further configured to drive a timer when the light signal received from the sensor is detected in the reception area smaller than the reference size, to increase the amount of light for the light source signal to transmit to the sensor when the light signal received from the sensor is detected in the reception area smaller than the reference size after the timer is ended, and to decrease the amount of light for the light source signal to transmit to the sensor when the light signal received from the sensor is detected in a reception area larger than the reference size after the timer is ended.

17. The terminal of claim 8, wherein the receiver and the power source are arranged in a line in a left-and-right direction or in an up-and-down direction in the terminal.

18. The terminal of claim 17, further comprising:

a transmitter configured to transmit, to the sensor, a preparatory signal representing that the light source signal according to the increased amount of light is to be transmitted, wherein in a case where there are a plurality of transmitters, receivers, and power sources, the plurality of transmitters, receivers, and power sources are arranged in an N×M array or to be alternately located, and N and M are integers greater than 1.

\* \* \* \* \*